United States Patent [19]
Adams et al.

[11] Patent Number: 5,219,232
[45] Date of Patent: Jun. 15, 1993

[54] FLOATING BUSHING ROLLER BEARING

[75] Inventors: Thomas R. Adams, Huntington Beach; Gary R. Wittman, Costa Mesa, both of Calif.

[73] Assignee: Tiodize Company, Inc., Huntington Beach, Calif.

[21] Appl. No.: 799,208

[22] Filed: Nov. 27, 1991

[51] Int. Cl.$^5$ ..................... F16C 17/18; F16C 13/00
[52] U.S. Cl. ................................... 384/275; 384/418; 384/901
[58] Field of Search ................. 384/50, 58, 52, 54, 384/275, 276, 296–300, 418, 901

[56] References Cited
U.S. PATENT DOCUMENTS

| | | | |
|---|---|---|---|
| 3,086,826 | 4/1963 | Gunnell | 384/901 X |
| 3,499,183 | 3/1970 | Parsons | 384/276 X |
| 4,395,142 | 7/1983 | Lobeck | 384/192 |
| 4,428,689 | 1/1984 | Choate | 384/296 |
| 4,685,184 | 8/1987 | Satkamp | 384/275 X |
| 4,717,268 | 1/1988 | Orkin | 384/200 |
| 5,056,938 | 10/1991 | Ahlman et al. | 384/276 X |

FOREIGN PATENT DOCUMENTS

| | | | |
|---|---|---|---|
| 622998 | 6/1927 | France | 384/276 |
| 750060 | 6/1956 | United Kingdom | 384/901 |
| 930283 | 7/1963 | United Kingdom | 384/901 |
| 976698 | 12/1964 | United Kingdom | 384/50 |

Primary Examiner—Thomas R. Hannon
Attorney, Agent, or Firm—Hawes & Fischer

[57] ABSTRACT

A bushing roller bearing having particular application for use in a wing flap assembly of an aircraft by which a wing flap is raised or lowered. The bearing includes metallic, coaxially aligned outer and inner races and a non-metallic intermediate liner disposed therebetween. The inner race is coupled to and rotatable with a shaft that is interconnected with the wing flap. The outer race is adapted to rotate (i.e. ride) along a wing flap track at the wing of an aircraft. The intermediate liner is formed from a self-lubricating composite material which reduces wear and friction between the outer and inner races. The intermediate liner floats through the bearing, such that a clearance exists between the liner and the races to permit the liner to be displaced laterally and radially. By virtue of the intermediate liner, the susceptibility of the bearing excessive wear, to lock-up and possible failure is reduced.

10 Claims, 1 Drawing Sheet

FLOATING BUSHING ROLLER BEARING

BACKGROUND OF THE INVENTION

1. Field of the Invention

This invention relates to a relatively lightweight, self-lubricating bushing roller bearing including a floating composite liner and having particular application for use in a wing flap assembly of an aircraft to raise and lower a wing flap.

2. Background Art

Metallic roller bearings have long been used in wing flap assemblies to raise and lower a wing flap with which the assembly is associated. However, conventional metallic roller bearings having pluralities of metallic rollers are undesirably susceptible to fatigue and/or lock-up and, consequently, are known to have a relatively short life. Moreover, the metallic roller bearings must be periodically lubricated to reduce friction and wear. As will be known to those skilled in the art, the lubrication often washes out of the conventional metallic bearing as a result of deicing the wings, cleaning the aircraft, and various environmental conditions (e.g. sand, and the like). The premature loss of lubrication from the metallic roller bearings, the failure to lubricate the bearings on a timely basis, and the fatigue to which said bearings are subjected all contribute to failure and the need to frequently replace said bearings which correspondingly increases aircraft maintenance costs and down time.

In addition, the large number of roller be replace said bearings which correspondingly increases aircraft maintenance costs and down time.

In addition, the large number of roller bearings, and the metallic rollers therein, which are usually carried on an aircraft wing as part of the wing flap assembly increases the total weight of the wing and the load of the aircraft. The foregoing weight increase causes a corresponding increase in fuel consumption and operating costs.

It would therefore be desirable to have available a relatively lightweight, longer life bushing roller bearing for use in a wing flap assembly that would eliminate the need for periodic lubrication and frequent replacement.

SUMMARY OF THE INVENTION

In general terms, a relatively lightweight, low maintenance bushing roller bearing is disclosed of the type having particular application for use in a wing flap assembly of an aircraft to raise and lower a wing flap. The bushing roller bearing includes a cylindrical outer race or tire and a cylindrical inner race that is coaxially aligned with and spaced radially inward from the outer race. Each of the outer and inner races is manufactured from metal (e.g. steel). The outer race is received in and adapted to ride through a wing flap track. The inner race is coupled to a shaft which extends through the center of the bearing for interconnection with the wing flap. Located in the space between the metallic inner and outer races is a non-metallic intermediate liner that is manufactured from a self-lubricating composite material comprising, for example, carbon fibers and lubricative pigments suspended in a resin matrix. The intermediate liner is not bonded to either of the outer or inner races, but floats freely through the bearing. That is to say, a clearance is established between the intermediate liner and the outer and inner races, such that said liner is adapted to be displaced both laterally relative to the races in a direction parallel to the longitudinal axis of the bearing and radially relative to the races in a direction perpendicular to the longitudinal axis.

The intermediate liner comprises a pair of cylindrical liner sections that are adapted to rotate independently of one another with either one of the outer or inner races so as to reduce friction and minimize wear. Likewise, the outer and inner races are adapted to rotate independently of one another to reduce the susceptibility of the bearing to lock-up and possible failure.

DETAILED DESCRIPTION OF THE INVENTION

Figure 2:
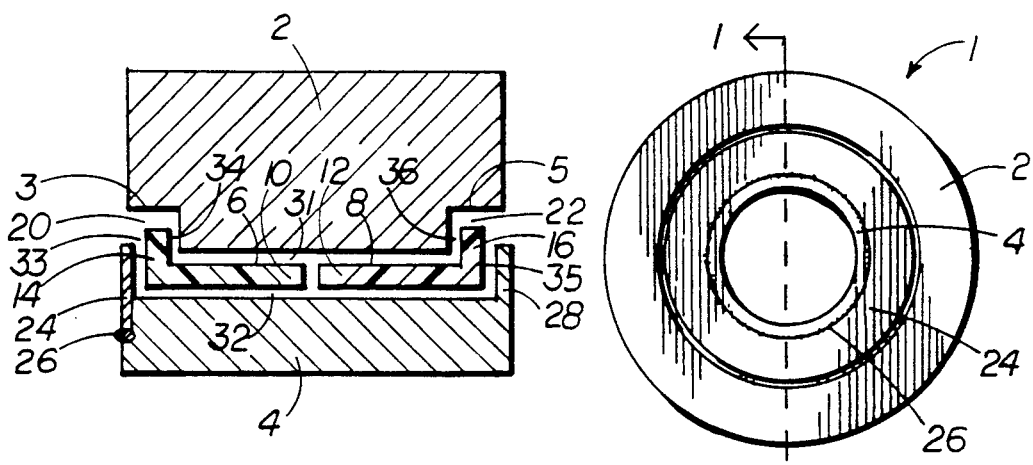
FIG. 2 is a side view of the roller bearing of FIG. 1.
Figures 1, 3:
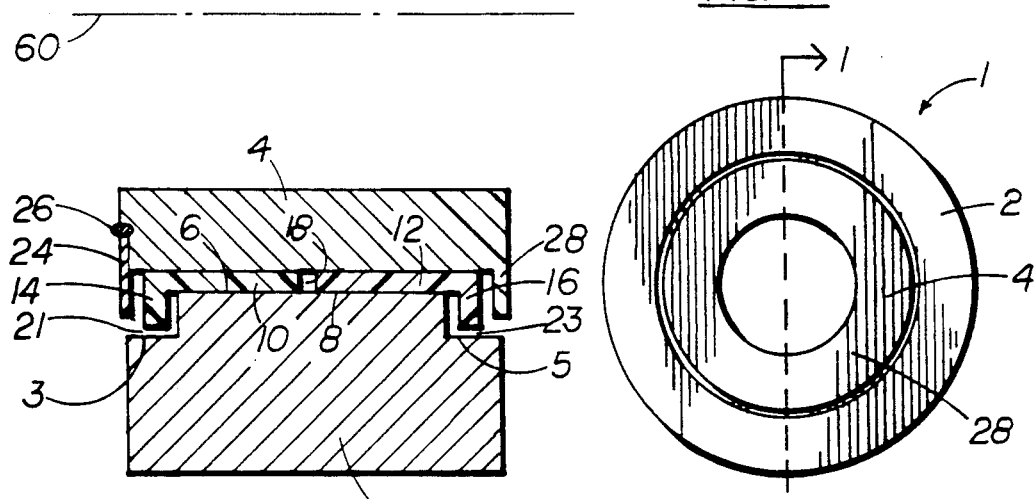
FIG. 1 is a cross section of the bushing roller bearing which forms the present invention.
FIG. 3 is an opposite side view of the roller bearing of FIG. 1.

The relatively lightweight, long life, and low maintenance bushing roller bearing 1 which forms the present invention is now described in detail while initially referring to FIGS. 1-3 of the drawings. Bushing roller bearing 1 includes a cylindrical outer race 2 (sometimes known as a tire) and a cylindrical inner race 4. The inner race 4 is coaxially aligned with and spaced radially inward from the outer race 2. Both the outer and inner races 2 and 4 are manufactured from metal. By way of example, races 2 and 4 may be manufactured from 440C stainless steel, Carpenter Custom 455 steel, or any other suitable steel. The inner race 4 is coupled to a rotatable shaft (designated 50 in FIG. 4) so as to be rotatable therewith. The outer race 2 is rotatable independently of inner race 4 as bearing 1 rides along a track of a wing flap (designated 40 in FIG. 4).

Positioned between the outer and inner races 2 and 4 of bushing roller bearing 1 is a floating intermediate liner assembly comprising a pair of identical intermediate liners 6 and 8. That is to say, and as an important advantage of the present invention, the intermediate liners 6 and 8 are not bonded to either race 2 or 4 or to any other surface, but are adapted to float through bearing 1. What is more, the presence of the floating intermediate liner assembly between the outer and inner races 2 and 4 avoids a metal-to-metal interface as is common to conventional all-metal roller bearings. As another important advantage of the present invention, the intermediate liners 6 and 8 are manufactured from a self-lubricating composite material, such as, for example, that comprising carbon fibers and lubricative pigment (e.g. PTFE, also known commercially as Teflon) suspended in a resin matrix (e.g. containing a polyimide resin). By virtue of its self-lubricating composite composition, the intermediate liners 6 and 8 will advantageously provide the bearing 1 with a self-lubricating characteristic and thereby eliminate the need to provide periodic lubrication, as is otherwise required in conventional all-metal adapted to rotate independently of one another and with either one of the rotatable outer race 2 or inner race 4.

Each of the intermediate liners 6 and 8 has a cylindrical body 10 and 12 and an annular flange 14 and 16 which projects radially outward from first ends of cylindrical bodies 10 and 12. The opposite ends of the cylindrical bodies 10 and 12 of liners 6 and 8 are axially aligned with and spaced from one another by a short gap 18, although this gap may be eliminated entirely such that liners 6 and 8 will abut one another. The annular flanges 14 and 16 of intermediate liners 6 and 8 are received within respective recesses 3 and 5 formed in the outer race 2 of bearing 1. However, clearances 20, 21 and 22, 23 (the details of which will be described hereinafter) are established between the annular flanges 14 and 16 of intermediate liners 6 and 8 and the ends of the respective recesses 3 and 5 of outer race 2 within which said flanges are received.

Bearing 1 also includes an annular metallic bearing face 24 which extends between the outer and inner races 2 and 4 along one side of bearing 1. More particularly, one end of bearing face 24 is affixed to one side of the inner race 4 by means of a conventional metal-to-metal weld 26. The other end of bearing face 24 projects into the recess 3 formed in outer race 2, although the bearing face 24 is spaced from said outer race to avoid friction therebetween. Bearing face 24 prevents the inadvertant removal of the intermediate liner 6 from roller bearing 1 after assembly of the bearing has been completed.

The side of inner race 4 opposite that to which bearing face 24 is welded includes an annular extension 28 coextensively formed therewith and projecting radially outward therefrom towards outer race 2. The extension 28 is received within the recess 5 formed in the outer race 2, although extension 28 is spaced from said outer race to avoid friction therebetween. Extension 28 prevents the removal of intermediate liner 8 from roller bearing 1 after assembly of the bearing has been completed. In an alternate embodiment, the extension 28 may be welded to inner race 4 in the same manner that bearing face 24 is welded to race 4.

As previously disclosed, the intermediate liner assembly of roller bearing 1 comprises a pair of intermediate liners 6 and 8 which float through the bushing roller bearing 1. More particularly either both the intermediate liners 6 and 8 may rotate with the outer race 2 or inner race 4. In addition, and being that the intermediate liners 6 and 8 are not bonded to either of the outer or inner races 2 and 4, the liners 6 and 8 are adapted to be displaced both laterally relative to races 2 and 4 in a direction parallel to the longitudinal axis 60 of the bearing and radially relative to the races 2 and 4 in a direction perpendicular to such longitudinal axis. To this end, and is best illustrated in the bearing configuration of FIG. 1, the intermediate liners 6 and 8 are shown located within a cylindrical space between the outer and inner races 2 and 4. The radial dimension (i.e. width) of this space between outer and inner races 2 and 4 is normally greater than the width of the cylindrical bodies 10 and 12 of liners 6 and 8. Therefore, in the unloaded condition of bearing 1 (best shown in the upper half of FIG. 1), clearances 31 and 32 will exist between the cylindrical bodies 10 and 12 of intermediate liners 6 and 8 the outer and inner races 2 and 4. It is preferable that each of the clearances 31 and 32 be at least 0.001–0.002 inches. However, with bushing roller bearing 1 under a load (best shown in the lower half of FIG. 1), the intermediate liners 6 and 8 will be sandwiched between the outer and inner races 2 and 4 to which the load is applied, whereby the clearances 31 and 32 associated with the unloaded bearing will be eliminated. Of course, the loading of bearing 1 could be reversed, such that the load bearing surfaces thereof would be at the upper half of FIG. 1.

To assure the complete freedom of movement of the floating liner assembly, the intermediate liners 6 and 8 are spaced laterally from the outer race 2 and each of the bearing face 24 at one side of bushing roller bearing 1 and the extension 28 of inner race 4 at the opposite side of bearing 1. More particularly, the intermediate liner 6 is sized so that a first clearance 33 exists between the annular flange 14 thereof and the bearing face 24, and a second clearance 34 exists between flange 14 and outer race 2. The sum of the first and second clearances 33 and 34 through which intermediate liner 6 may be laterally displaced should be greater than 0.004 inches and preferably between 0.010 and 0.012 inches. Likewise, the intermediate liner 8 is sized so that a first clearance 35 exists between the annular flange 16 thereof and the extension 28 of inner race 4, and a second clearance 36 exists between flange 16 and the outer race 2. The sum of the first and second clearances 35 and 36 through which intermediate liner 8 may be laterally displaced is substantially identical to the clearances 33 and 34 for intermediate liner 6.

As was earlier disclosed, the annular flanges 14 and 16 at the ends of cylindrical bodies 10 and 12 of intermediate liners 6 and 8 are received in respective recesses 3 and 5, but are spaced from the outer race 2. More particularly, a first clearance 20 exists between the flange 14 of intermediate liner 6 and the non-load bearing surface of outer race 2 within which the recess 3 is formed. A second clearance 21 exists between flange 14 and the load bearing surface of outer race 2 within which recess 3 is formed. The sum of the first and second clearances 20 and 21 between flange 14 and outer race 2 is preferably approximately 0.005 inches. Likewise, a first clearance 22 exists between the annular flange 16 of intermediate liner 8 and the non-load bearing surface of outer race 2 within which the recess 5 is formed. A second clearance 23 exists between flange 16 and the load bearing surface of outer race 2 within which the recess 5 is formed. The sum of the first and second clearances 22 ad 23 between flange 16 and outer race 2 is also preferably approximately 0.005 inches.

Figure 4:
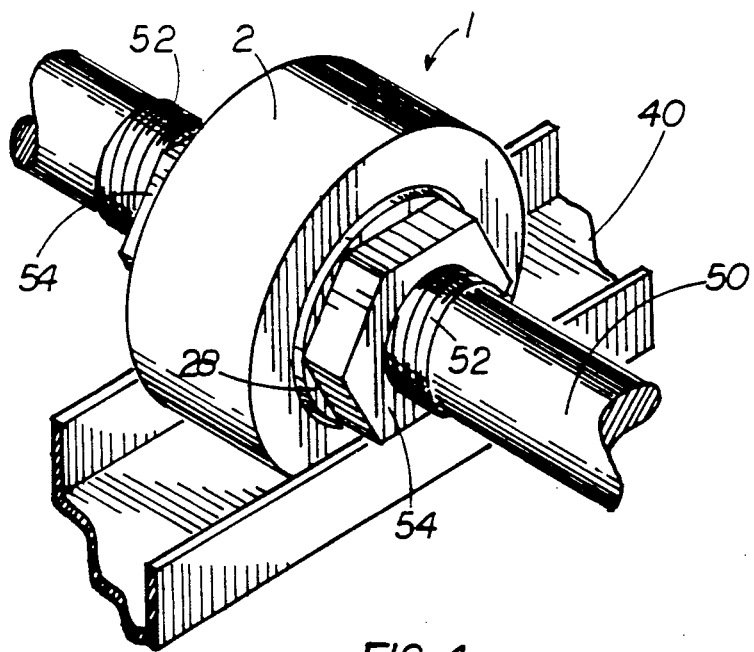
FIG. 4 shows the roller bearing of FIG. 1 coupled to a shaft and movable along the track of a wing flap system of an aircraft.

Referring now to FIG. 4 of the drawings, the bushing roller bearing 1 is shown mated to a rotatable shaft 50 and positioned within a wing flap rail or track 40. The shaft 50 is received through the center of bearing 1, such that a rotation of the shaft is transferred to the bearing at the inner race 4. The shaft 40 includes screw threads 52 by which to receive suitable fasteners 54 at opposite sides of bearing 1. In this manner, the lateral position of bearing 1 may be fixed along shaft 52 and the shaft and inner race 4 may be coupled to one another sot hat they will rotate in unison.

The bushing roller bearing 1 is rotatable along the outer race or tire 2 through the track 40. One end of shaft 50 is interconnected with the wing flap (not shown) of an aircraft, so that the up or down movements of said wing flap will coincide with the direction in which bearing 1 rides through track 40. Although a single bushing roller bearing 1 is illustrated, it is contemplated that a plurality of such bearings will be located in track 40 and driven by respective shafts so as to control the movement of the wing flap.

The bushing roller bearing 1 of this invention includes a floating liner assembly comprising self-lubricating, non-metallic intermediate liners 6 and 8, one or both of which is adapted to rotate with the outer and inner races 2 and 4. In the alternative, the outer and inner races 2 and 4 can easily slide (i.e. rotate) along either one or both of the intermediate liners 6 and 8. Thus, the bearing will be less likely to lock up and will have better wear characteristics with less chance of bearing failure. Similarly, the outer race 2 of roller bearing 1 will be more likely to roll, as opposed to slide, along the wing flap track 40. Moreover, should solid debris enter the bearing between the metallic races 2 and 4 and one of the intermediate liners 6 and 8, the other liner may still rotate to prevent the bearing from binding during use. Being that the intermediate liner assembly is floating relative to the metallic races 2 and 4, as opposed to being adhesively bonded thereto, the bearing 1 will be easier and less expensive to manufacture that if the liner and races had been bonded together. In addition, there would be no adhesive bond to break and no adhesive failure to contemplate under high load conditions. The non-metallic intermediate liners 6 and 8 avoid the use of metallic rollers as is common to conventional roller bearings. By virtue of the foregoing, the weight of the bearing 1 as well as the total weight of the wing flap assembly may be reduced so as to advantageously reduce aircraft loading and improve the fuel consumption characteristics.

It will be apparent that while a preferred embodiment of the invention has been shown and described, various changes and modifications may be made without departing from the true spirit and scope of the invention. For example, while the busing roller bearing 1 has been described as having particular application for use in a wing flap assembly, this is not to be regarded as a limitation of the invention, and bearing 1 may be coupled to a shaft and used in other applications that are common to conventional roller bearings.

Have thus set forth a preferred embodiment, what is claimed is:

1. A bushing roller bearing having a longitudinally extending axis and comprising a metallic outer race, a metallic inner race coaxially aligned with and spaced radially from said outer race, and an intermediate liner formed from a non-metallic material and floating freely in the space between said outer and inner races, the radial distance of said space between said outer and inner races being greater than the width of said intermediate liner such that a clearance exists between said liner and each of said outer and inner races, said liner adapted to move laterally through said space between said races in a direction parallel to the longitudinally extending axis of said bearing and radially through said space in a direction perpendicular to said longitudinally extending axis, said outer and inner races adapted to rotate independently of one another over said liner.

2. The bushing roller bearing recited in claim 1, wherein said non-metallic intermediate liner is formed from a self-lubricating material.

3. The bushing roller bearing recited in claim 2, wherein said self-lubricating material is a composite comprising non-metallic fibers and lubricative pigments suspended in a resin matrix.

4. The bushing roller bearing recited in claim 1, wherein said intermediate liner comprises first and second liner sections that are adapted to rotate independently of one another with either one of said outer or inner races.

5. The bushing roller bearing recited in claim 4, wherein each of said first and second liner sections comprises a cylindrical body having an annular flange projecting radially outward from one end thereof, the opposite ends of said cylindrical bodies being axially aligned with one another and said annular flanges being received within respective recesses formed in opposite sides of said outer race.

6. The bushing roller bearing recited in claim 5, further comprising a metallic bearing face extending radially between the recess at one side of said outer race and said inner race to prevent the removal of at least one of said first and second liner sections from the space between said outer and inner races.

7. The bushing roller bearing recited in claim 6, wherein said bearing face is welded to said inner race.

8. The bushing roller bearing recited in claim 1, wherein said inner race surrounds a central opening extending longitudinally through said bearing and sized to receive a rotatable shaft, such that a rotation of said shaft is imparted to said inner race to cause said inner race to rotate.

9. The bushing roller bearing recited in claim 1, wherein said intermediate liner is adapted to rotate with either one of said inner or outer races after a load is applied to said bearing and said liner moves radially through the space between said races.

10. The bushing roller bearing recited in claim 1, wherein said intermediate liner has a radially projecting flange formed at each end thereof and said outer race has a pair of recesses formed therein in which to receive respective ones of said flanges, said flanges being spaced from said outer race when said flanges are received in said recesses.

* * * * *